No. 682,684. Patented Sept. 17, 1901.
C. HAKEMEYER.
SNAP HOOK.
(Application filed Oct. 22, 1900.)
(No Model.)
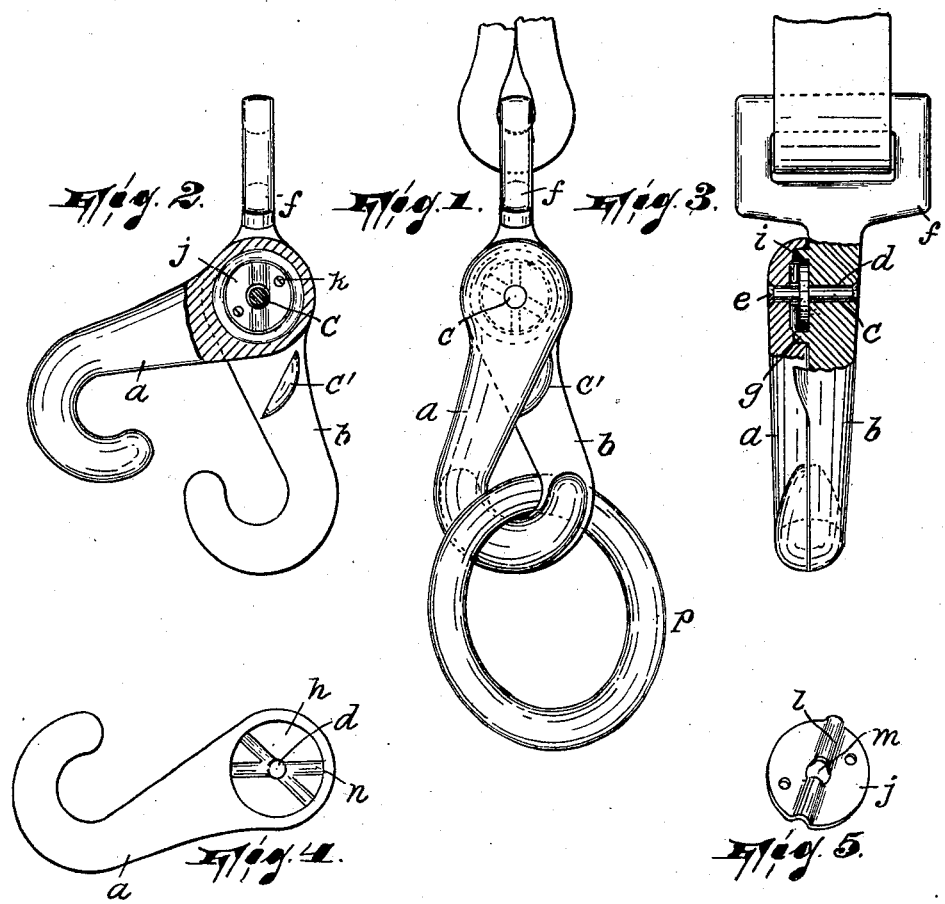
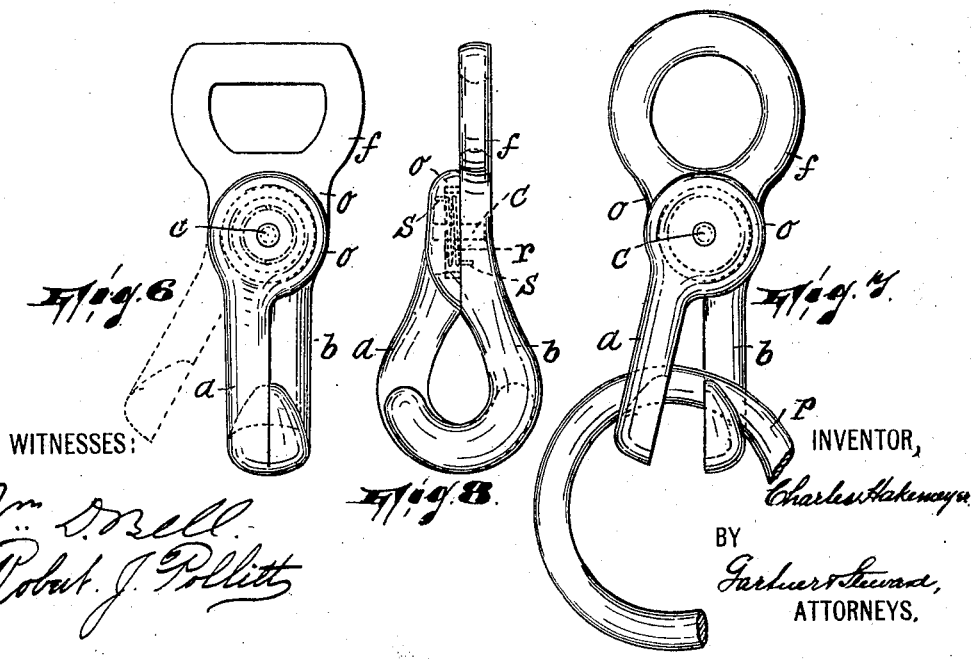
WITNESSES:
INVENTOR,
Charles Hakemeyer
BY
Gartner & Steward,
ATTORNEYS.
THE NORRIS PETERS CO., PHOTO-LITHO., WASHINGTON, D. C.

UNITED STATES PATENT OFFICE.

CHARLES HAKEMEYER, OF PATERSON, NEW JERSEY.

SNAP-HOOK.

SPECIFICATION forming part of Letters Patent No. 682,684, dated September 17, 1901.

Application filed October 22, 1900. Serial No. 33,805. (No model.)

*To all whom it may concern:*

Be it known that I, CHARLES HAKEMEYER, a citizen of the United States, residing in Paterson, in the county of Passaic and State of New Jersey, have invented certain new and useful Improvements in Snap-Hooks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to snap-hooks; and it has reference particularly to that form of device of this nature which comprises two substantially similar members having a common pivot and disposed in relatively reverse positions, thus producing what is commonly known as a "sister-hook."

The invention consists in the improved snap-hook, constructed substantially as will be hereinafter described, and finally embodied in the clauses of the claim.

I have fully illustrated my invention in the accompanying drawings, wherein—

Figure 1 is a view in front elevation of the preferred form of my invention, the device being closed. Fig. 2 is a view like Fig. 1, except that the device is open and a section of one of its members is shown as broken away to illustrate inclosed portions. Fig. 3 is a view in side elevation of what is shown in Fig. 1, a portion of the device being broken away on the line of the pivot of its members to show inclosed parts. Fig. 4 is a view of one of the hook members of the device shown in Fig. 1. Fig. 5 is a perspective view of a plate-spring which controls said hook members; and Figs. 6, 7, and 8 are views of a modification of my invention, Figs. 6 and 7 being side views thereof, showing, respectively, the hook closed and open, and Fig. 8 being a front view of said hook.

Referring to the first five figures of the drawings, $a$ and $b$ denote the two hook members, said hook members being pivotally connected at the free ends of their shank portions by a pivot $c$, which penetrates an orifice $d$ in each of them and has its ends riveted, as at $e$, in the usual manner, so as to maintain the members together. As usual, the adjacent faces of these members are perfectly flat, with the exception that one of them has an integral lug $c'$, which acts as a stop against which the other member may impinge when the hook is closed, as in Fig. 1. From the free end of the shank of the hook member $b$ extends an integral loop $f$, to which a strap or other device carrying the snap-hook may be attached. One of the hook members—say the hook member $b$—has an annular boss or flange $g$ projecting from the face thereof adjacent the other member. This boss surrounds the opening $d$, and it is adapted to be received by a circular recess $h$, which is correspondingly disposed in the other hook member. Thus is afforded a medium which not only takes off of the pivot $c$ a part of the strain which it would otherwise have to assume, but which forms a chamber $i$. The said chamber $i$ is provided for the reception of a plate-spring $j$ in the form of a disk, which is preferably secured to either one of the members by means of screws $k$. Said plate-spring is formed with a single diametrical crimp or bend $l$. It also has an opening $m$, through which the pivot $c$ extends. In the portion of the face of the other member which is opposed to said plate-spring are formed elongated recesses $n$, which intersect each other at the opening $d$ of said member. When the parts have been assembled, with the plate-spring in position between the two hook members, the crimp or bend $l$ is adapted to be received by the one or the other of the recesses $n$, and thus hold the members open or closed, as the case may be. The shape of the bend or crimp and the elasticity of the plate-spring should be such that the opening or closing of the hook, except by intention, is well insured against.

In the modification shown in the remaining figures the free end portions of the shanks are enlarged and turned substantially at right angles to the planes of the hook portions proper, the hook members being secured together by the pivot $c$ the same as in the case of that form of my invention already described. Thus a part, such as the ring $p$, (shown in the drawings,) which engages this form of the hook cannot be released by simply opening the latter; but after the hook is opened it must be first turned at right angles. The hook members come together face to face when closing instead of wiping the one on the other, as in the case of the other form of my invention.

If desired, a spiral spring may be employed to normally maintain the hook members together, whether the hook be of the form shown in the first five figures of the drawings or in the form of that shown in the last three figures. In the chamber $i$, about the pivot $c$, is arranged said spiral spring $r$, the same having its ends turned in opposite directions and parallel to its axis and projecting into orifices $s$, formed in the respective members.

It will be observed that the projection $g$ snugly fits the recess $h$. They thus coact to practically constitute the bearing of the device, for the riveted pivot $c$ serves more as a means for keeping the members close together than as the real bearing. It will be also observed that the projection $g$ extends from the member $b$ farther than the recess $h$ extends into the member $a$. Thus the projection is adapted to contact with the member $a$ inside the recess to thus act to space the adjacent faces of the two members, reducing to the minimum the extent of contact-surface, so that however tightly the pivot may be riveted the members will not unduly bind against each other.

Having thus fully described my invention, what I claim as new, and desire to secure by Letters Patent, is—

In a hook, the combination of two hook-shaped members adapted to coact in engaging another part, one of said members having a circular recess on the face thereof adjacent the other member and being also provided in the bottom of said recess with two elongated grooves or recesses intersecting in the center of the circular recess, a continuous annular projection on the other member extending into and snugly fitting the circular recess and being of a depth slightly greater than the depth of said circular recess and bearing with its face against the bottom thereof, a plate-spring secured to the annular projection-carrying member and provided with a diametrical crimp or bend adapted to coöperate with the intersecting grooves or recesses in the first-mentioned member, and a riveted pivot securing both members close together, all said parts substantially as and for the purposes described.

In testimony that I claim the foregoing I have hereunto set my hand this 16th day of October, 1900.

CHARLES HAKEMEYER.

Witnesses:
JOHN W. STEWARD,
JAMES B. NEWTON.